United States Patent [19]

Nakatsuka

[11] Patent Number: 5,696,841
[45] Date of Patent: Dec. 9, 1997

[54] IMAGE PROCESSING METHOD AND APPARATUS FOR EXTRACTING VERTICALLY AND HORIZONTALLY WRITTEN TEXT

[75] Inventor: Tadanori Nakatsuka, Machida, Japan

[73] Assignee: Canon Kabushiki Kaisha, Tokyo, Japan

[21] Appl. No.: 135,129

[22] Filed: Oct. 12, 1993

Related U.S. Application Data

[63] Continuation of Ser. No. 739,651, Aug. 2, 1991, abandoned.

[30] Foreign Application Priority Data

| Aug. 3, 1990 | [JP] | Japan | 2-205229 |
| Jul. 30, 1991 | [JP] | Japan | 3-190238 |

[51] Int. Cl.$^6$ .................................................. G06K 9/60
[52] U.S. Cl. ............................ 382/174; 382/176; 358/462
[58] Field of Search .......................... 382/9, 18, 46, 382/48, 174, 290, 176, 180, 173; 358/462

[56] References Cited

U.S. PATENT DOCUMENTS

| 4,338,588 | 7/1982 | Chevillat et al. | 382/46 |
| 4,817,169 | 3/1989 | Peppers et al. | 382/173 |
| 4,827,529 | 5/1989 | Peppers et al. | 382/9 |
| 5,001,766 | 3/1991 | Baird | 382/18 |
| 5,073,949 | 12/1991 | Takada et al. | 382/18 |
| 5,091,964 | 2/1992 | Shimomura | 358/462 |
| 5,191,438 | 3/1993 | Katsurada et al. | 382/290 |

FOREIGN PATENT DOCUMENTS

| 62-200486 | 9/1987 | Japan | 382/18 |

OTHER PUBLICATIONS

Akiyama et al. "Repetitive Character Extraction Method for Printed Documents", ECLTS, 1985, pp. 59–72.
Shih et al. "Document Segmentation, Classification, and Recognition System" IEEE 1992.
Ikawi et al., "A Segmentation Method Based on Office Document Hierarchical Structure", Proc. of 1987 IEEE Intl. Conf. on Systems, Man & Cybernetics, pp. 759–763.
Patent Abstracts of Japan, vol. 005, No. 084 (kokai 56–031174) (Mar. 1981).
Patent Abstracts of Japan, vol. 012, No. 451 (kokai 63–173188) (Jul. 1988).
Ying et al., "Automatic Recognition of Province Name on the LIcense Plate of Moving Vehicle", 9th Intl. Conf. on Pattern Recognition, pp. 927–929.

*Primary Examiner*—Leo Boudreau
*Assistant Examiner*—Jon Chang
*Attorney, Agent, or Firm*—Fitzpatrick, Cella, Harper & Scinto

[57] ABSTRACT

This character recognition method is capable of determining the direction of row of characters, applicable to a language which can be written in horizontal or vertical direction, such as Japanese. The method takes projections in both directions, by counting black pixels, and compares the obtained counts with a threshold value (or with each other). The text is identified as horizontally or vertically written, respectively, according as the count exceeds the threshold value more in the horizontal or vertical direction. A projection is taken again in the perpendicular direction, after the writing direction is determined, to extract each character, which is subjected to character recognition in known manner. Thus the method can achieve automatic recognition, without instruction of the direction of writing by the operator.

21 Claims, 19 Drawing Sheets

DESKTOP PUBLISHING IS PERSONALLY PRODUCING PRINTED DOCUMENTS USING A DESKTOP COMPUTER AND COMPACT LASER PRINTER, OR

| HORIZONTAL \ VERTICAL | $\geq \beta$ | $< \beta$ |
|---|---|---|
| $\geq \alpha$ | AREA A | AREA B |
| $< \alpha$ | AREA C | AREA D |

IMAGE PROCESSING METHOD AND APPARATUS FOR EXTRACTING VERTICALLY AND HORIZONTALLY WRITTEN TEXT

This application is a continuation of application Ser. No. 07/739,651, filed Aug. 2, 1991, now abandoned.

BACKGROUND OF THE INVENTION

1. Field of the Invention

The present invention relates to an image processing method for receiving text image information in which horizontal or vertical writing is not identified, and recognizing characters etc. in said text image information, and an apparatus therefor.

2. Related Background Art

Conventional character recognition apparatus is composed of an input unit for reading a text image, a pre-treatment unit for extracting a character from the input image and applying various normalizations to the extracted image, and a recognition unit for extracting geometrical features from the normalized pattern and comparing said features with standard patterns stored in advance in a dictionary, thereby recognizing the character portion of said text image. Since the Japanese text may be present in vertical writing, in addition to ordinary horizontal writing, the pre-treatment unit for extracting the character pattern in the character recognition apparatus for Japanese characters has been designed, for a horizontally written text image, to extract a row of characters by taking a horizontal image projection, and to extract a character by taking a vertical image projection of the thus extracted row or rows. Also, for a vertically written text image, a row of characters is extracted by taking a vertical image projection, and a character is extracted by taking a horizontal image projection on thus extracted row or rows.

For designating a vertically or horizontally written area in text image information, there is already known an apparatus allowing the operator, on a display of the image information entered by the user, to designate an area therein and to designate whether said area is vertically or horizontally written.

For this reason, the character recognition apparatus for Japanese characters employs different processing for the horizontal writing and for the vertical writing. It has therefore been necessary to prepare a character recognition apparatus exclusively for horizontal or vertical writing, or to designate whether the writing is horizontal or vertical prior to character recognition.

In consideration of the drawbacks of the prior technology explained above, the object of the present invention is to provide a character recognition apparatus capable of character recognition, by detecting whether the text image is vertically or horizontally written, based on said text image.

Also, in the above-explained prior technology, if vertically and horizontally written texts are mixedly present in the image information, as in the case of magazines, the user is required to execute a cumbersome operation of designating each vertically or horizontally written area and classifying each area as vertically or horizontally written.

SUMMARY OF THE INVENTION

The object of the present invention is to resolve the drawbacks in the above-explained prior technology, and to discriminate whether the text of input image information is vertically or horizontally written. This is done, for example, by taking histograms in the vertical and horizontal directions on the entered text image information, and comparing the thus prepared histograms with suitable reference values or investigating the relationships of said histograms in the vertical and horizontal directions.

Also, in image information containing vertically written text and horizontally written text in mixed manner, the detection of areas and of the mode of writing in each area can be achieved without the action of the operator, by partially analyzing the histograms in both horizontal and vertical directions.

BRIEF DESCRIPTION OF THE DRAWINGS

FIG. 13 is a first view for explaining an embodiment 3.1;

FIG. 14 is a second view for explaining embodiment 3.1;

FIG. 15 is a third view for explaining embodiment 3.1;

FIG. 16 is a fourth view for explaining embodiment 3.1;

DESCRIPTION OF THE PREFERRED EMBODIMENTS

Now the present invention will be clarified in detail by reference to the preferred embodiments thereof shown in the attached drawings.

Figure 1:
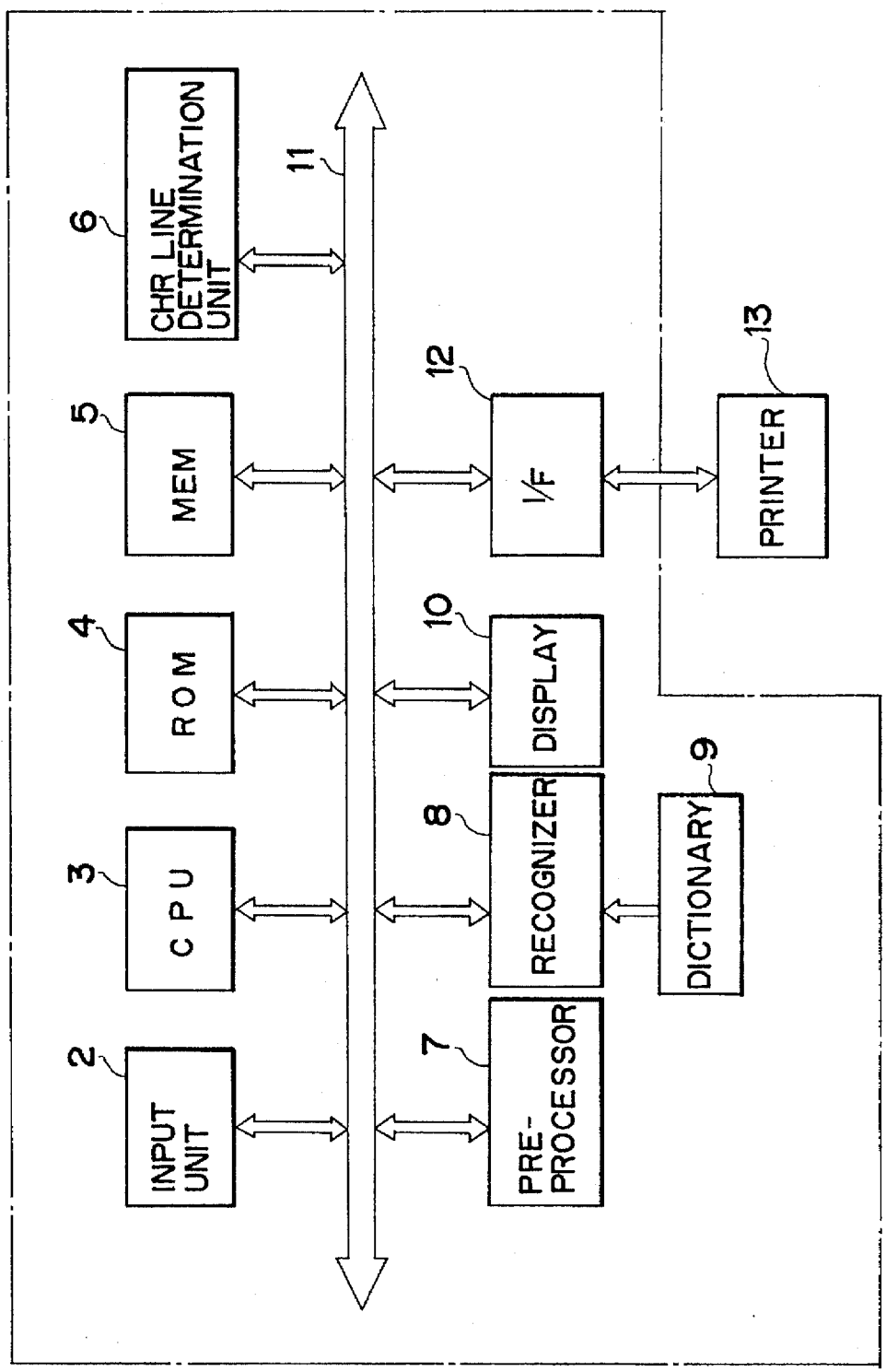
FIG. 1 is a block diagram of an image processing apparatus embodying the present invention.

Description of character recognition apparatus (FIG. 1)

FIG. 1 is a schematic block diagram of a character recognition apparatus embodying the present invention, common to all the embodiments.

In FIG. 1 there are shown the entire character recognition apparatus 1 of the present embodiment; an input unit 2, composed for example of a scanner, for reading a text image and generating digital original image data; a central processing unit (CPU) 3 for controlling the entire apparatus; a ROM 4 storing a control program for the CPU 3 corresponding to flow charts to be explained later and other various data; and a memory (RAM) 5 used as a work area of the CPU 3 and also having an area for storing the text image data entered from the input unit 2.

Figure 18:
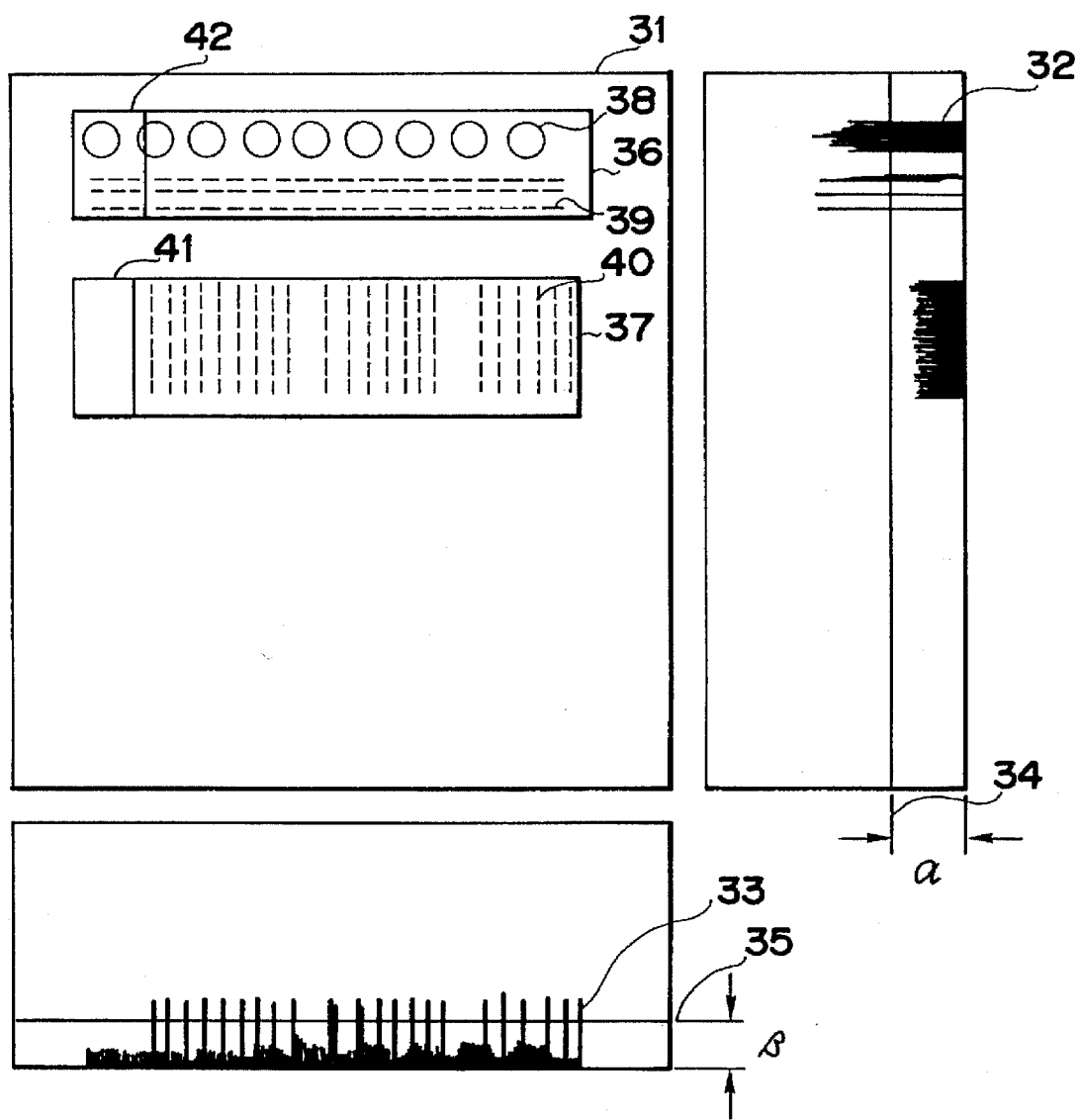
FIG. 18 is a view showing a third example of projections of the input text image information.

There are further shown a character row determination unit 6 for determining the direction of a row of characters in the text image stored in the memory 5, namely whether said text is vertically or horizontally written, and extracting respective areas if vertical and horizontal writings are mixedly present as shown in FIG. 18; a pre-processing unit 7 for extracting the pattern of a character from the text image stored in the memory 5 and effecting various normalizations; a recognition unit 8 for extracting geometrical features from the pattern pre-processed by the pre-processing unit 7 and comparing said features with standard patterns stored in advance in a dictionary 9 for recognition; a display unit 10 for displaying, for example, the result of recognition on the input text image; a system bus 11 including a data bus, an address bus, a control signal bus etc. from the CPU 3; and an interface unit 12 for interface control with an external output unit such as a printer 13.

Figure 2:
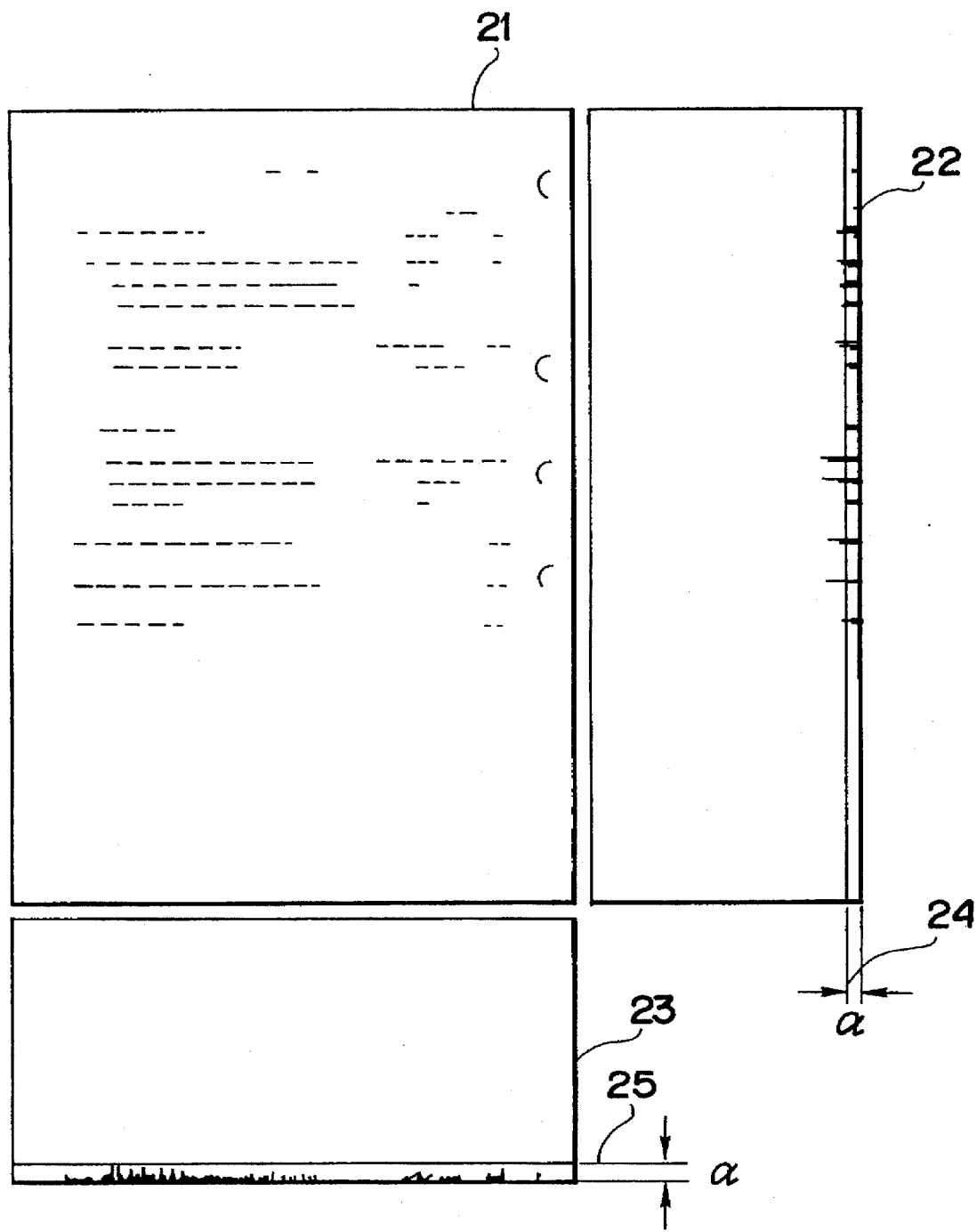
FIG. 2 is a view showing an example of projections of input text image information in said embodiment.

Description of text image (FIG. 2)

FIG. 2 shows an example of text image entered into the character recognition apparatus of the present embodiment.

In FIG. 2 there are shown a text image 21 read by the input unit 2; a projection 22 of the text image 21 (count of black pixels) when it is scanned in the horizontal direction; a similar projection 23 of said text image 21 obtained by vertical scanning; and lines 24, 25 indicating a reference value $\alpha$.

In the example shown in FIG. 2, the entered text image 21 is horizontally written, and it will be understood that the number of lines in which the count of black pixels exceeds the reference value $\alpha$ is larger in the horizontal direction than in the vertical direction.

Figure 3:
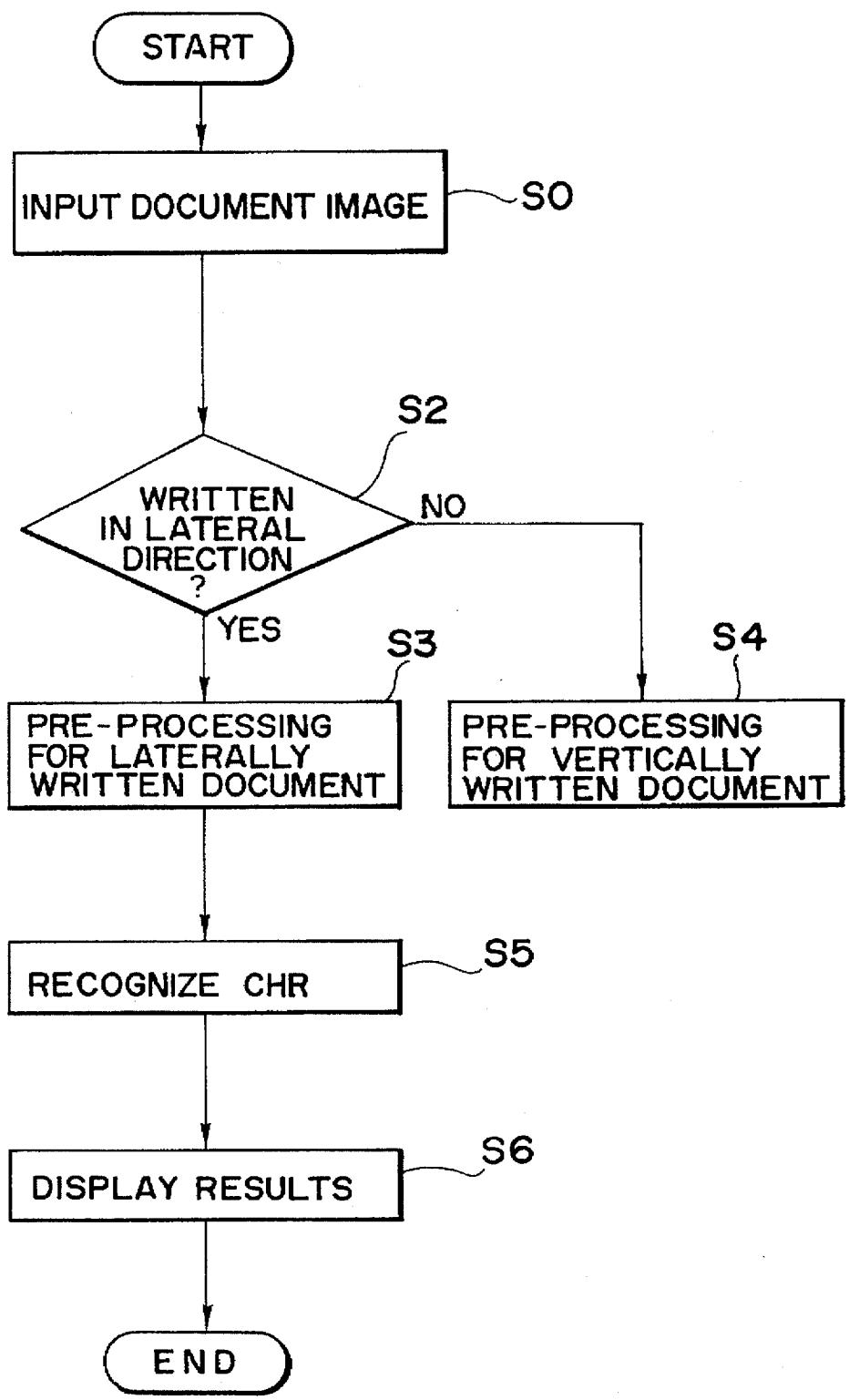
FIG. 3 is a first flow chart of the recognition process of said embodiment.

1.1 Embodiment of counting black pixels in each row, utilizing the reference value $\alpha$ FIG. 3 is a flow chart of the control sequence of the CPU 3 in the present embodiment, and a corresponding control program is stored in the ROM 4.

At first a step S0 reads a text image, set by the operator, by the input unit 2 (scanner), and stores it in the memory 5. In a next step S2, the character line determination unit 6 discriminates whether the text image stored in the memory 5 is horizontally or vertically written, by calculating the projections (counts of black pixels) of said text image in the horizontal and vertical directions, then determining the ratio of number of lines in which said pixel count exceeds the reference value $\alpha$ to the total number of lines, and comparing said ratio for the horizontal direction with that for the vertical direction.

Figure 4:
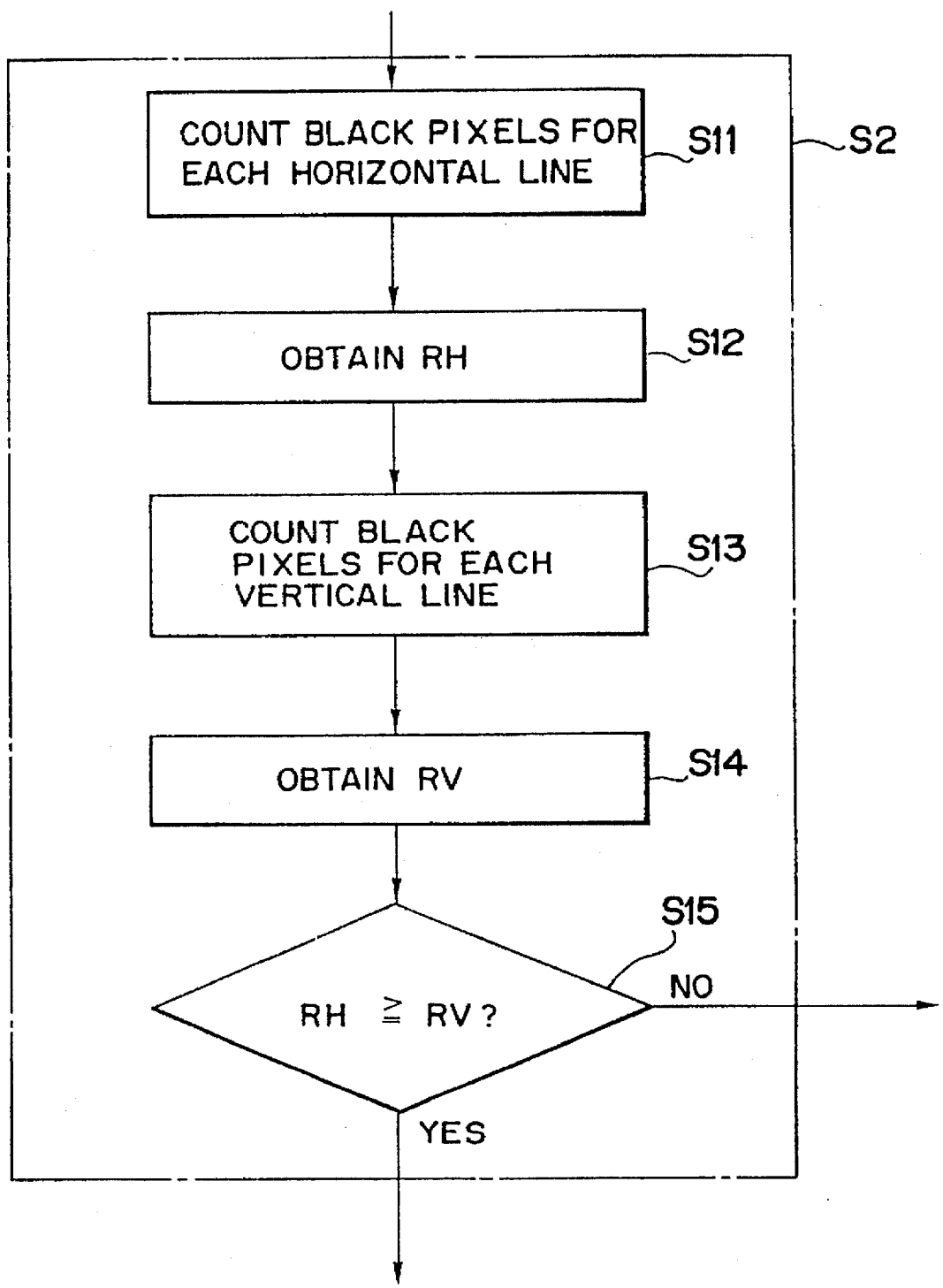
FIG. 4 is a first flow chart of a process for detecting the direction of a row of characters.

FIG. 4 shows the details of said step S2 executed by the determination unit 6. At first a step S11 counts the number of black pixels for each horizontal line, and a step S12 determines the number of lines in which the obtained count is equal to or larger than the reference value $\alpha$. This operation is conducted for all the horizontal lines (number TH) of the text image, and the number UH of lines in which the count is equal to or larger than the reference value $\alpha$ is determined. Then the ratio RH of the number UH of lines in which the pixel count is equal to or larger than the reference value $\alpha$ to the total line number TH is calculated by:

$$RH = UH/TH.$$

Then a step S13 counts the number of black pixels in each vertical line, and a step S14 discriminates whether the count is at least equal to the reference value $\alpha$. This operation is conducted for all the vertical lines (number TV), and the number UV of lines in which the count is equal to or larger than the reference value $\alpha$ is determined. Then the ratio RV of said line number UV to the total line number TV is calculated by:

$$RV = UV/TV.$$

Then a step S15 compares the obtained ratio RH for the horizontal direction with that RV for the vertical direction. If the condition $RH \geq RV$ is satisfied, the text image is identified as horizontally written.

Referring again to FIG. 3, and if the text image is horizontally written, the sequence proceeds to a step S3 to effect pre-processing for horizontal writing in the pre-processing unit 7. Said pre-processing for horizontal writing consists of character extraction by extracting a row of characters by taking a projection in the horizontal direction and extracting a character by taking a projection in the vertical direction on the extracted row(s) of characters, normalization of position, inclination, line width and density of the character, and noise elimination.

On the other hand, if the condition $RH \geq RV$ is not satisfied in the step S2, the text image stored in the memory 5 is identified as vertically written, and a step S4 executes pre-processing for vertical writing in the pre-processing unit 7. Said pre-processing consists of character extraction by extracting a row of characters by taking a projection in the vertical direction and extracting a character by taking a projection in the horizontal direction on the extracted row(s) of characters, normalization of position, inclination, line width and density of the character, and noise elimination.

Then, in step S5, the recognition unit 8 effects extraction of features such as contour line on each unknown character pattern pre-processed in the pre-processing unit 7. The dictionary 9 stores the features of standard patterns of all the characters to be identified. The feature of the unknown character pattern is matched with all the features of the standard patterns stored in the dictionary 9, and a character pattern of the highest probability is stored as the result of recognition in the memory 5. All the characters of the input text image are similarly recognized and stored in the memory 5. A next step S6 displays the results of recognition, stored in the memory 5, on the display unit 10. An output process of characters by the printer 13 is omitted for the purpose of simplicity.

As explained in the foregoing, this embodiment provides a character recognition apparatus which can adapt texts of horizontal and vertical writings and is therefore easily usable for the users.

1.2 Variation of 1.1: embodiment with counting from vertical direction

Figure 5:
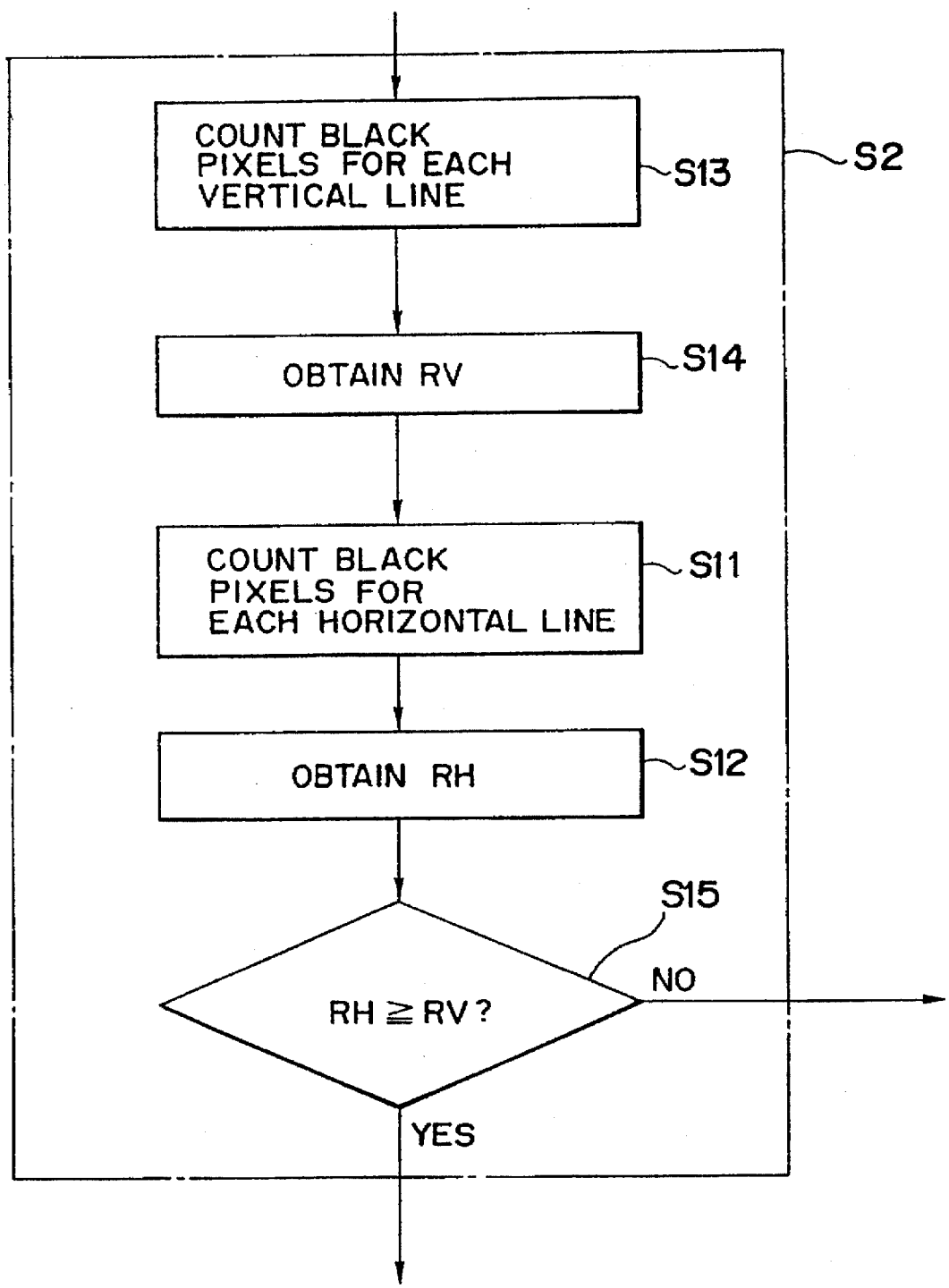
FIG. 5 is a second flow chart of the process for detecting the direction of a row of characters.

FIG. 5 shows the details of the step S2, in FIG. 3, for discriminating whether the text image is horizontally or vertically written. In this embodiment, the order of sequence of the steps S11, S12 and the steps S13, S14 is inverted in comparison with the foregoing embodiment 1.1. More specifically, the embodiment 1.1 counts the black pixels at first in the horizontal direction and then in the vertical direction, whereas the present embodiment effects said counting at first in the vertical direction and then in the horizontal direction. The structure of the apparatus in the present embodiment is same as shown in FIG. 1.

The present embodiment can provide the same effects and advantages as in the foregoing embodiment 1.1.

1.3 Variation of 1.1: Embodiment for counting white pixels

Figure 6:
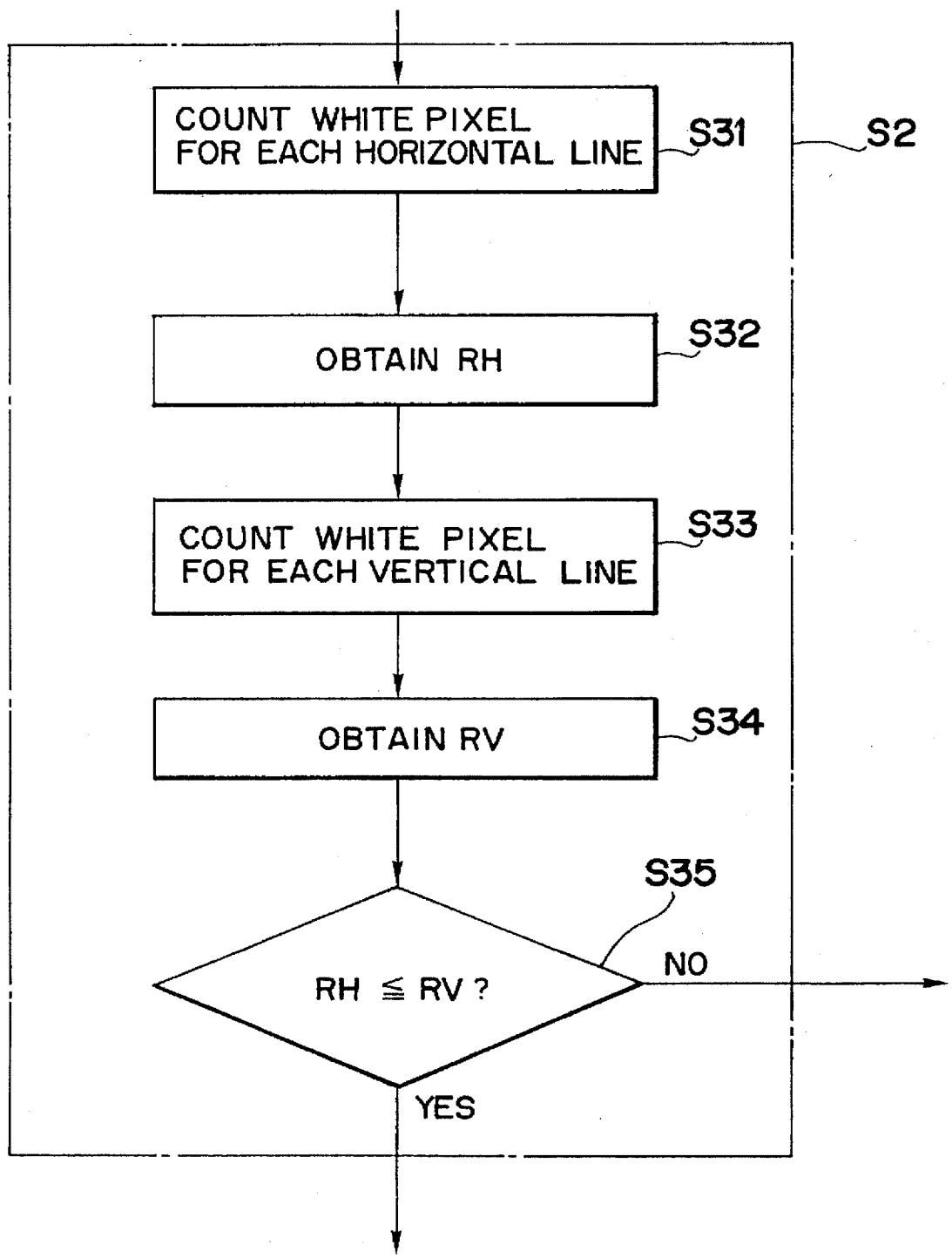
FIG. 6 is a third flow chart of the process for detecting the direction of a row of characters.

FIG. 6 is a flow chart of the present embodiment in which the counting of black pixels in the step S2 in the embodiment 1.1 is replaced by counting of white pixels. In this embodiment, the structure of the character recognition apparatus and the control sequence other than said step S2 are identical to those of the embodiment 1.1, shown in FIGS. 1 and 3.

At first a step S31 counts the white pixels in each horizontal line, and a step S32 discriminates whether the obtained count is at least equal to the reference value $\alpha$, then determines the number of lines in which the obtained count is at least equal to the reference value $\alpha$ over the entire input image, and calculates the ratio RH of the number of such lines to the entire number of lines.

Then a step S33 counts the white pixels in each vertical line, and a step S34 discriminates whether the obtained count is at least equal to the reference value $\alpha$, then determines the number of lines in which the obtained count is at least equal to the reference value $\alpha$ over the entire input image, and calculates the ratio RV of the number of such lines to the entire number of lines.

The next step S35 compares RH and RV, and the text image is identified as horizontally written or vertically written, respectively, according as the condition RH$\leq$RV is satisfied or not.

Also, the present embodiment can provide similar effects and advantages to those in the foregoing embodiments.

1.4 Variation of 1.1: Embodiment for counting plural lines

Figure 7:
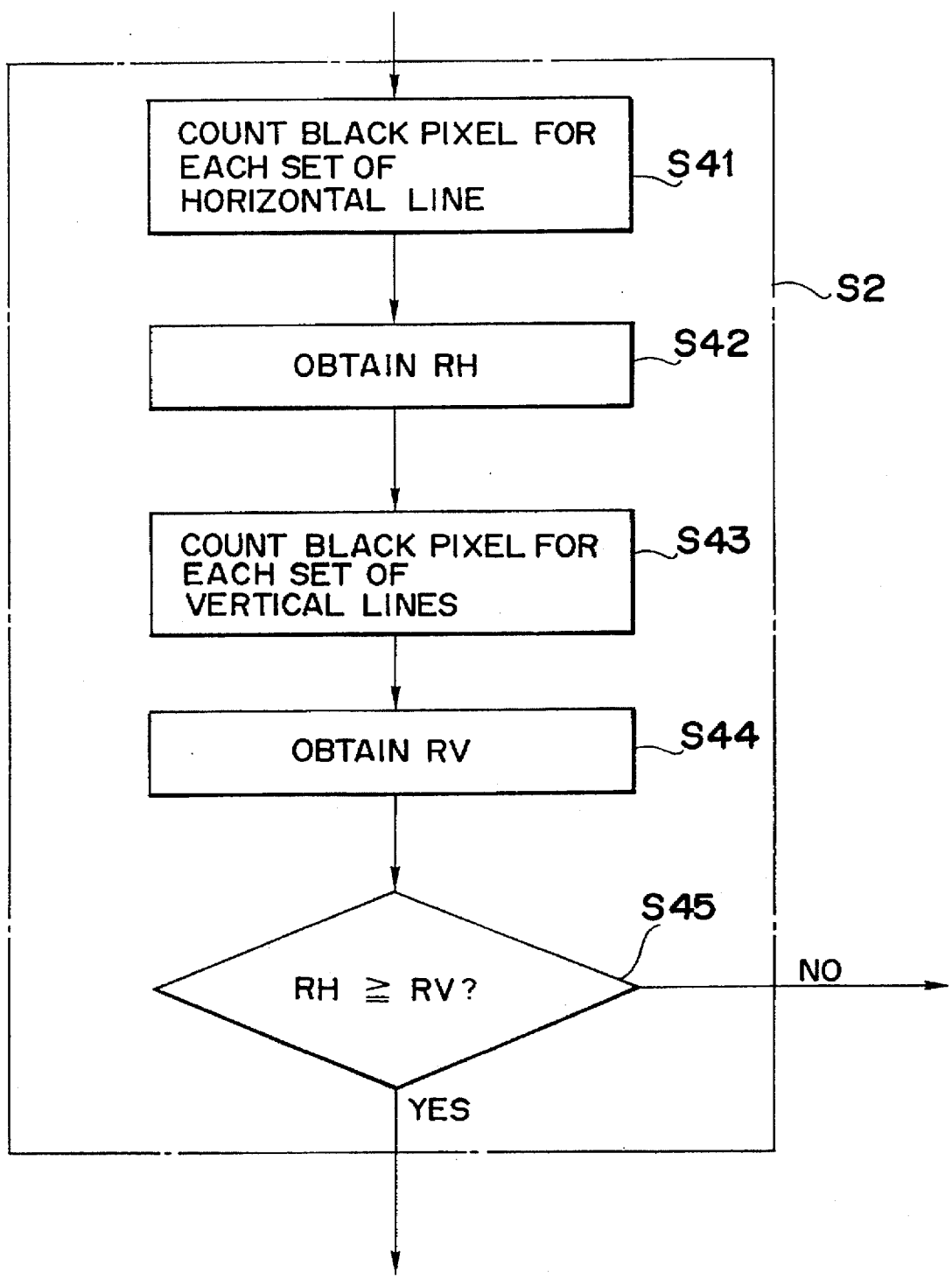
FIG. 7 is a fourth flow chart of the process for detecting the direction of a row of characters.

FIG. 7 is a flow chart of the present embodiment, in which the counting of black pixels in the step 2 of the embodiment 1.1 is replaced by counting of black pixels in plural lines. Also in this embodiment, the structure of the character recognition apparatus and the control sequence except for said step S2 are identical to those of the embodiment 1.1, shown in FIGS. 1 and 3.

At first a step S41 counts the black pixels in every set of plural lines, and a step S42 discriminates whether the obtained count is at least equal to a reference value $\alpha$, then determines, in the entire input image, the number of lines in which the obtained count is at least equal to said reference value $\alpha$, and calculates the ratio RH of the number of such line to the entire number of lines.

A step S43 similarly effects counting of black pixels in the vertical direction and a step S44 determines the ratio RV of the number of lines in which the count is at least equal to the reference value $\alpha$ to the entire number of lines.

The next step S45 compares thus determined RH and RV, and the text image is identified as horizontally written or vertically written, respectively, according as the condition RH$\geq$RV is satisfied or not.

The present embodiment explained above can also provide similar effects and advantages the those in the foregoing embodiments.

1.5 Variation of 1.3: Embodiment with counting from vertical direction

The above-explained embodiment 1.3 can provide similar effects and advantages as those in the embodiment 1.1 even when the sequence of horizontal counting and vertical counting is interchanged as in the embodiment 1.2. The configuration of the character recognition apparatus and the control sequence remain the same as those of the embodiment 1.1, shown in FIGS. 1 and 3, and the only difference lies in the step S2 shown in FIG. 6, in which the steps are executed in the order S33, S34, S31 and S32.

1.6 Variation of 1.3: Embodiment for counting plural lines

The above-explained embodiment 1.3 can provide similar effects and advantages as those in the embodiment 1.1, even when the counting for each line is replaced by counting of plural lines as the foregoing embodiment 1.4. In this embodiment, the configuration of the character recognition apparatus and the control sequence remain the same as those of the embodiment 1.1 shown in FIGS. 1 and 3, and the only difference lies in the step S2 in FIG. 6, in which the steps S31 and S33 execute counting on plural lines at a time instead on a single line.

1.7 Variation of 1.4: Embodiment with counting from vertical direction

The above-explained embodiment 1.4 can also provide similar effects and advantages to those of the embodiment 1.1, even when the sequence of horizontal counting and vertical counting is interchanged as in the embodiment 1.2. In this embodiment, the configuration of the character recognition apparatus and the control sequence remain the same as those of the embodiment 1.1 shown in FIGS. 1 and 3, and the only difference lies in the step S2 shown in FIG. 7, in which the steps are executed in the order S43, S44, S41 and S42.

1.8 Variation of 1.1: Embodiment of taking lines in which the count is equal to or less than the reference value $\alpha$ In the step S2 of the embodiment 1.1, shown in FIG. 4, the condition "the count of black pixels equal to or larger than the reference value $\alpha$" may be replaced by "the count of black pixels equal to or less than the reference value $\alpha$". In this embodiment, the configuration of the character recognition apparatus and the control sequence except for the step S2 are the same as those of the embodiment 1.1 shown in FIGS. 1 and 3.

Figure 8:
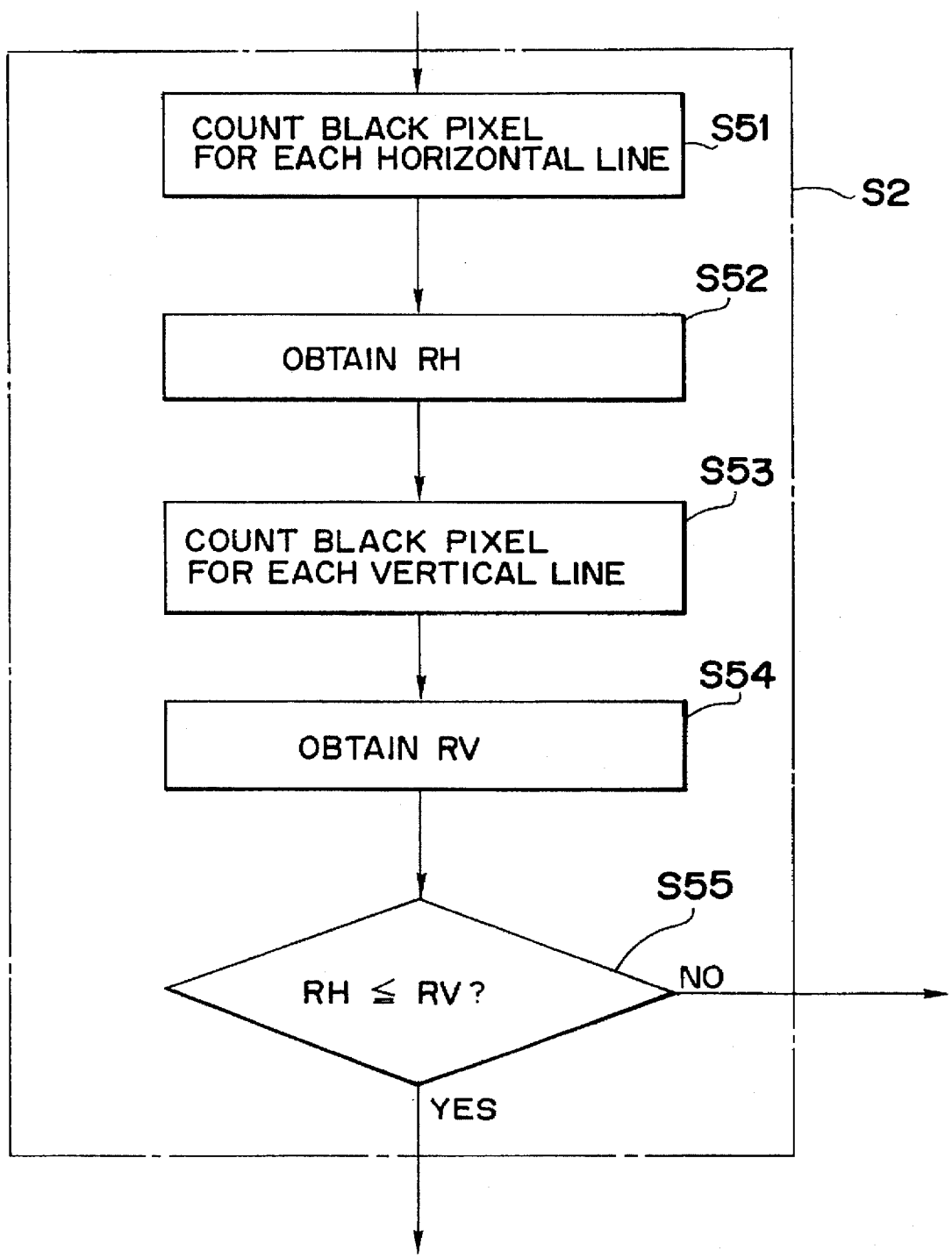
FIG. 8 is a fifth flow chart of the process for detecting the direction of a row of characters.

FIG. 8 shows the details of the step S2 of the control sequence in the present embodiment.

At first a step S51 counts the black pixels in each horizontal line, and discriminates whether the obtained count is not in excess of a reference value $\alpha$. Then a step S52 counts, in the entire input image, the number of lines in which the count is not in excess of the reference value $\alpha$, and calculates the ratio RH of the number of such lines to the entire number of horizontal lines.

Then a step S53 counts the black pixels in each vertical lines, and step S54 discriminates whether the obtained count is not in excess of the reference value $\alpha$, counts the number of lines in which the count is not in excess of the reference value $\alpha$, and calculates the ratio RV of such lines. A next step S55 compares RH with RV, and identifies the text image as horizontally or vertically written, respectively, according as the condition RH$\leq$RV is satisfied or not.

The above-explained embodiment 1.8 can provide similar effects and advantages to those in the aforementioned embodiment 1.1.

As explained in the foregoing, these embodiments are capable of automatically identifying the direction of row of characters in a text, thereby determining whether the text image is written horizontally or vertically. Consequently, in character recognition by reading a text image, the operator is no longer required to enter whether the text is horizontally or vertically written, and the operation of character recognition is therefore improved.

Figure 9:
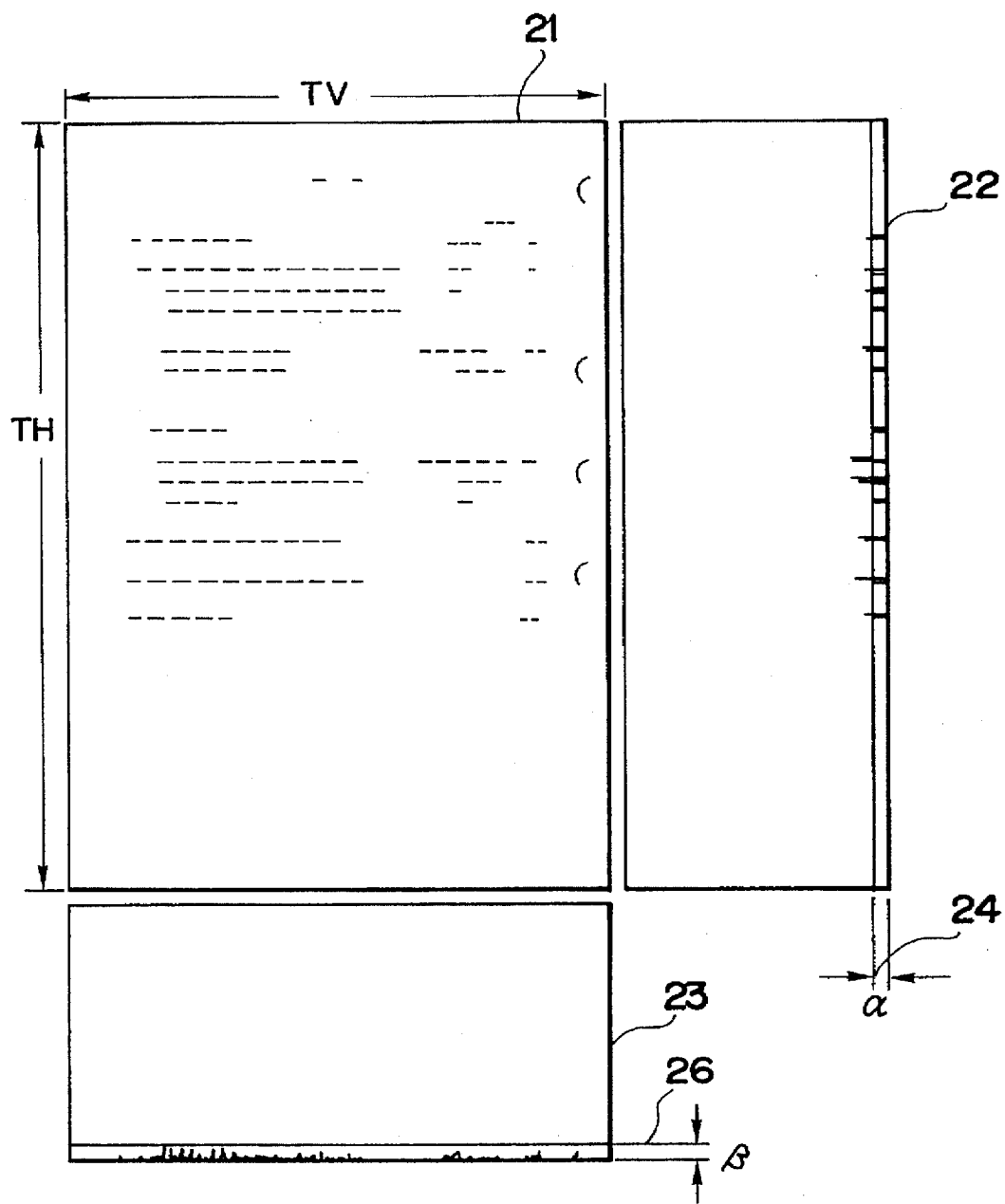
FIG. 9 is a view showing a second example of projections of the input text image information.

2.1 Embodiment of using different reference values for the horizontal and vertical directions In this embodiment, reference values $\alpha$, $\beta$ are employed respectively in the horizontal and vertical directions as shown in FIG. 9, instead of the single reference value α in the embodiment 1.1 shown in FIG. 2.

Figure 10:
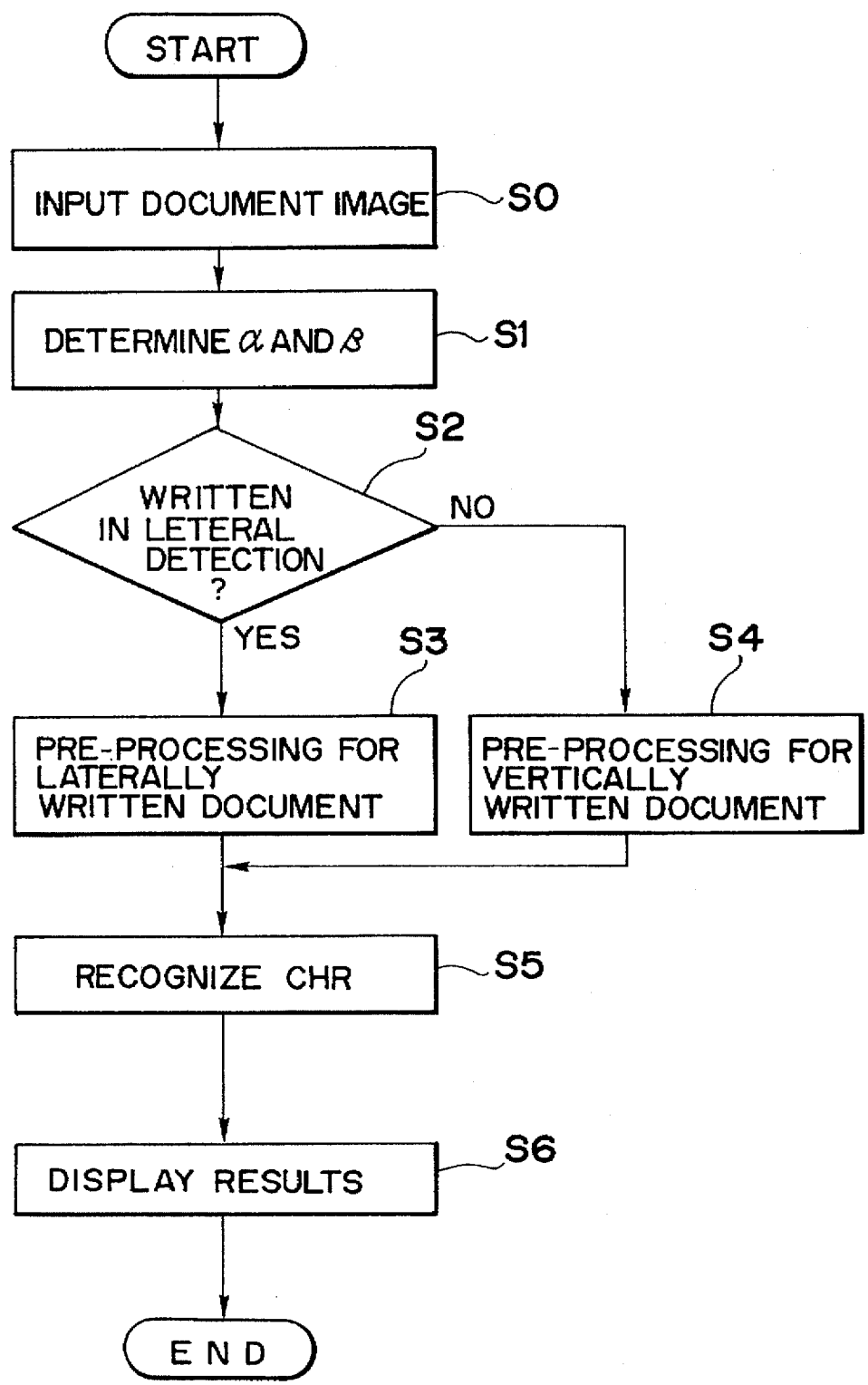
FIG. 10 is a second flow chart of the character recognition process.

Said reference values α, β are determined after the input of the image information as shown in the flow chart in FIG. 10. In the following, the step S1 alone will be explained since said flow chart differs only in said step S1 from that shown in FIG. 3.

The reference values α, β are determined in the step S1 in the following manner.

The reference values α, β respectively in the horizontal direction and in the vertical direction are given by:

$$\alpha = \frac{B \cdot TV}{S_H} + t_H,$$

$$\beta = \frac{B \cdot TH}{S_V} + t_V$$

where B is an initial reference value, TH and TV are total line numbers respectively in the horizontal and vertical directions in a designated area of the text image, and $S_H$, $S_V$, $t_H$, and $t_V$ are correction factors α for and β ($S_H \neq 0$, $S_V \neq 0$).

The use of the height and width of the designated area of the text image enables exact identification of vertical or horizontal writing, without being influenced by the vertical-to-horizontal ratio of the designated area.

FIG. 9 shows an example of identifying the horizontal or vertical writing in the entire area of the text image.

The reference values α, β determined in said step S1 may be employed similarly in the embodiments 1.1 to 1.8 shown in FIGS. 4 to 8.

2.2 Embodiment employing maximum black pixel count

Figure 11:
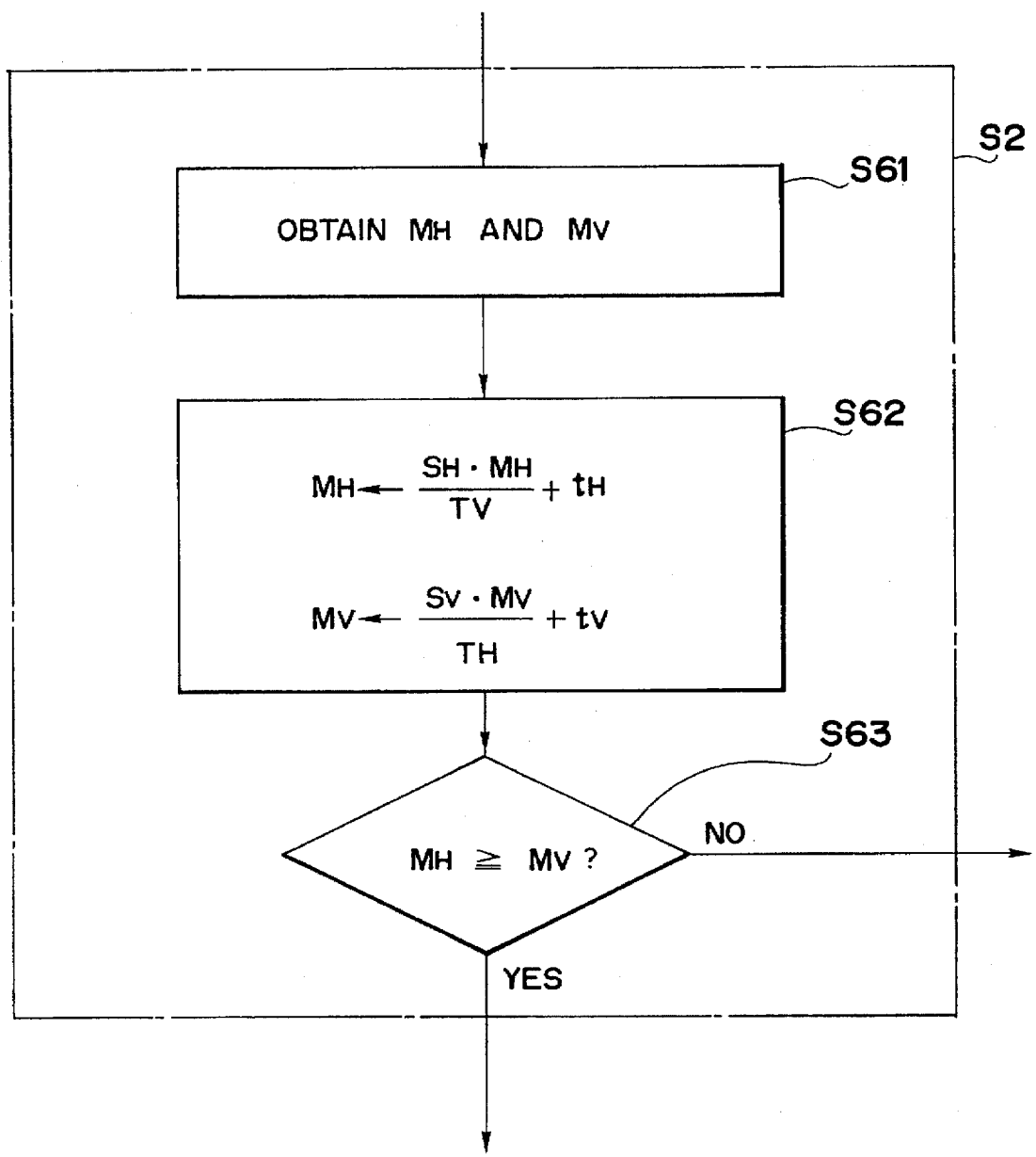
FIG. 11 is a sixth flow chart of the process for detecting the direction of a row of characters.

FIG. 11 shows the details of the step S2 shown in FIG. 3, for identifying whether the text image is horizontally or vertically written. A step S61 determines the maximum values $M_H$, $M_V$ of black pixels respectively in the horizontal and vertical directions, and corrects said maximum values with the horizontal line number TH, vertical line number VH and correction coefficients as indicated in FIG. 11. The next step S63 the thus corrected maximum values of the black pixels in the horizontal and vertical directions, and the text image is identified as horizontally or vertically written, respectively, according as the maximum value in the horizontal direction is larger or smaller than that in the vertical direction.

The configuration of the image processing apparatus in the present embodiment is the same as that shown in FIG. 1.

Figure 12:
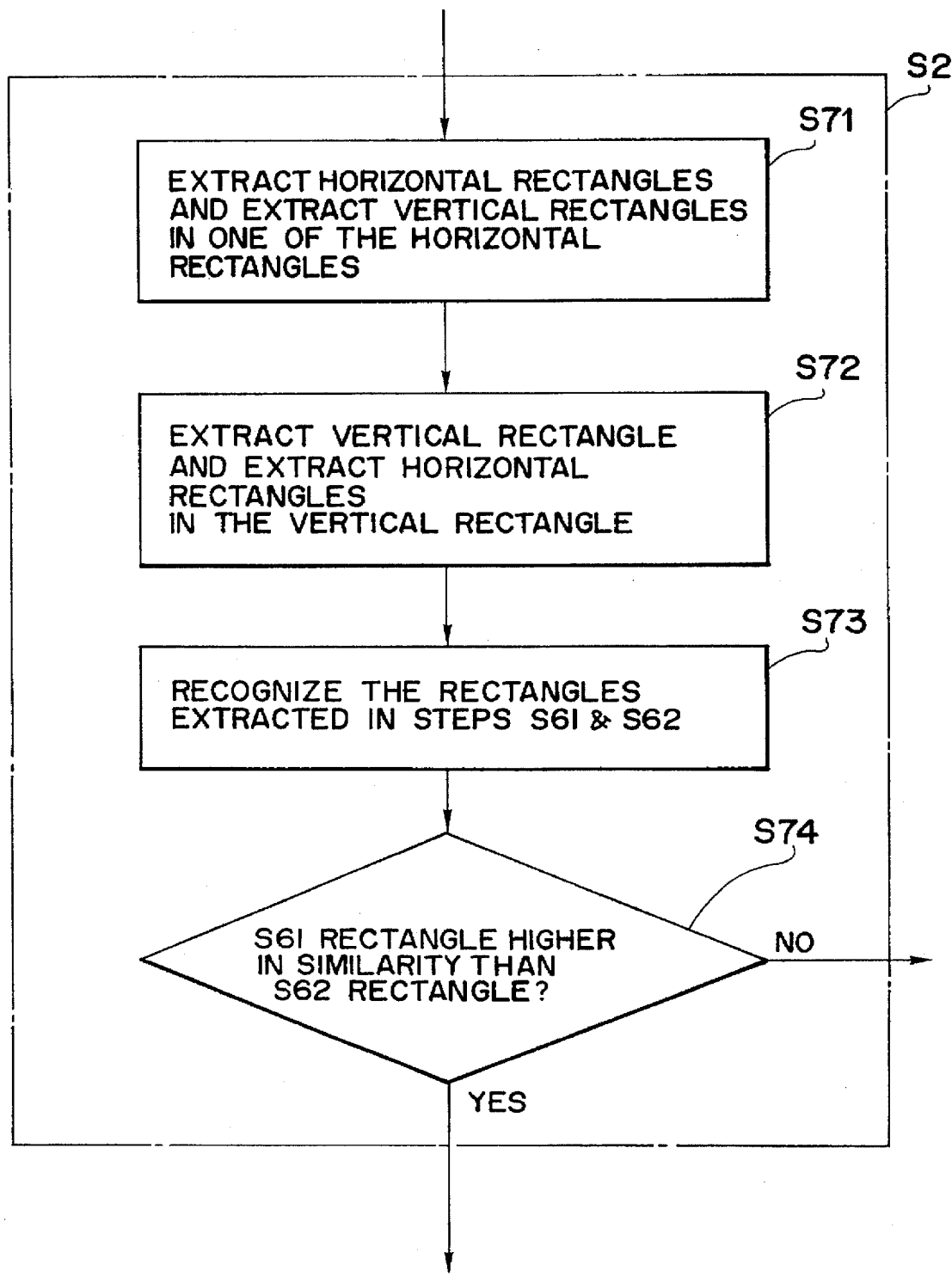
FIG. 12 is a seventh flow chart of the process for detecting the direction of a row of characters.

3.1 Embodiment assuming both horizontal and vertical writings and determining the direction from the similarity of the results of recognition FIG. 12 shows the details of the step S2, shown in FIG. 3, for discriminating whether the text image is horizontally or vertically written.

A step S71 extracts a rectangular area according to a histogram in the horizontal direction (FIG. 13), then prepares a histogram in the vertical direction in said extracted area, and extracts one or plural rectangular areas (FIG. 14). FIG. 14 shows only the rectangular areas extracted from the first row. Then a step S72 extracts a rectangular area according to a histogram in the vertical direction (FIG. 15), prepares a histogram in the horizontal direction in said extracted area, and extracts one or plural rectangular areas (FIG. 16). A next step S73 recognizes the rectangles extracted in the steps S71, S72, and a step S74 determines whether the text image is horizontally or vertically written, according to the level or similarity of said extracted rectangles.

Figure 17:
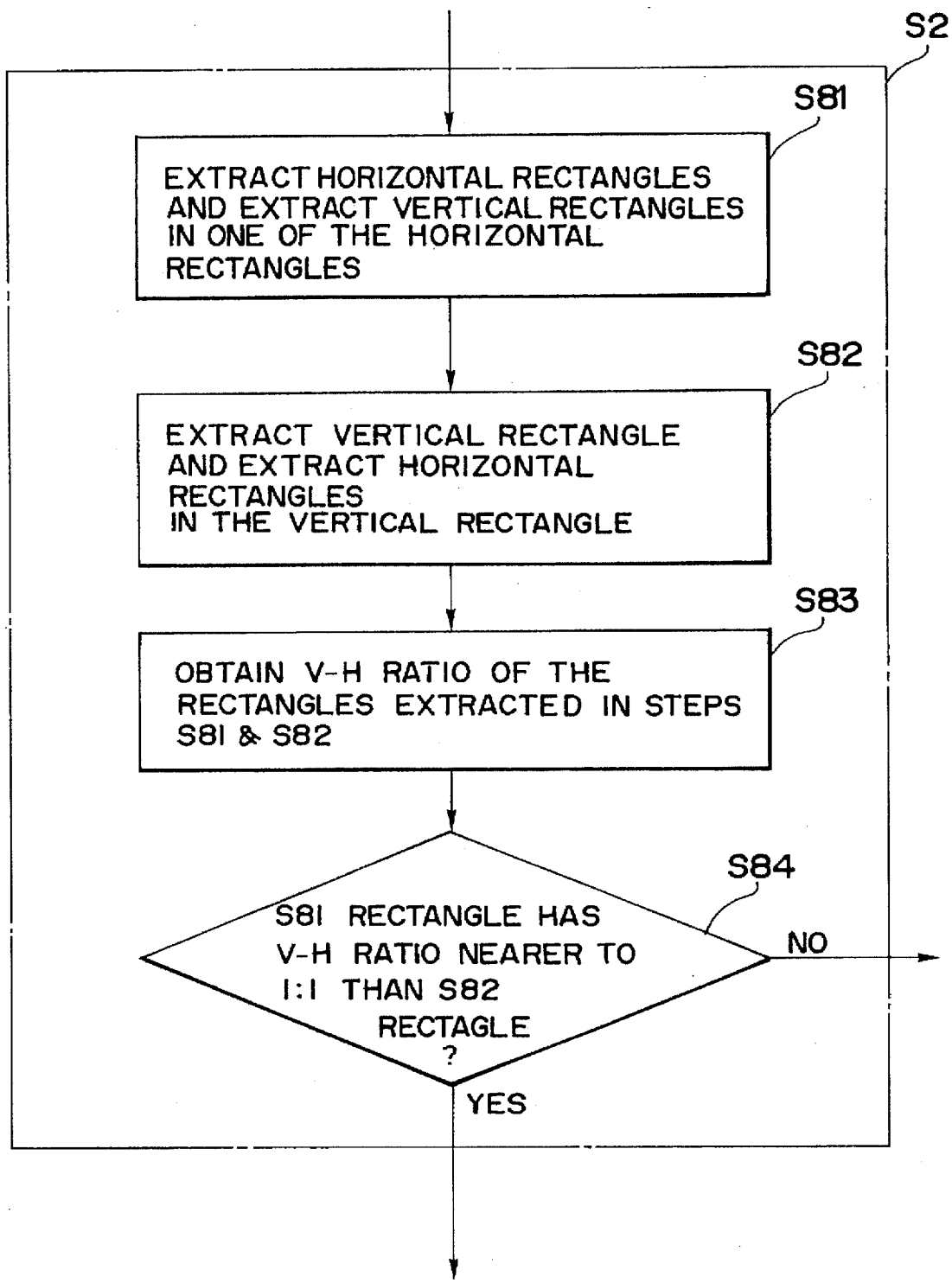
FIG. 17 is an eighth flow chart of the process for detecting the direction of a row of characters.

3.2 Embodiment of assuming both horizontal and vertical writings and determining the writing direction from the vertical-to-horizontal ratio of extracted rectangle FIG. 17 shows the details of the step S2, shown in FIG. 3, for determining whether the text image is horizontally or vertically written.

A step S81 extracts a rectangle according to the histogram in the horizontal direction (FIG. 13), then prepares a histogram in the vertical direction, in said rectangle, and extracts one or plural rectangles (FIG. 14). FIG. 14 only shows the rectangles extracted from the first row. Then a step S82 extracts a rectangle according to the histogram in the vertical direction (FIG. 15), then prepares a histogram in the horizontal direction, and extracts one or plural rectangles (FIG. 16). The next step S83 calculates the vertical-to-horizontal (V-H) ratio of the rectangles extracted in the steps S81 and S82.

In the example illustrated in FIGS. 14 and 16, the V-H ratio is apparently closer to 1:1 in the rectangle extracted in the step S81.

The next step S84 identifies the text image as horizontally or vertically written, respectively, according as the V-H ratio closer to 1:1 is obtained in the step S81 or not.

4.1 Embodiment for a text including both horizontally and vertically written areas FIG. 18 shows an example of the input text image input to the character recognition apparatus including vertically and horizontally written areas in mixed manner.

In FIG. 18 there are shown a text image 31 read by the input unit 2; a projection 32 of said text image (counts of black pixels) obtained by scanning said text image in the horizontal direction; a projection 33 of said text image obtained by scanning in the vertical direction; lines 34, 35 respectively corresponding to reference values α, β; horizontally written areas 36, 42 identified by the character row/area determination unit; a vertically written area 37; characters 38–40 in said areas; and an area 41 identified as free of characters.

In the example shown in FIG. 18, the input text image 31 contains both horizontally and vertically written texts.

Figure 19:
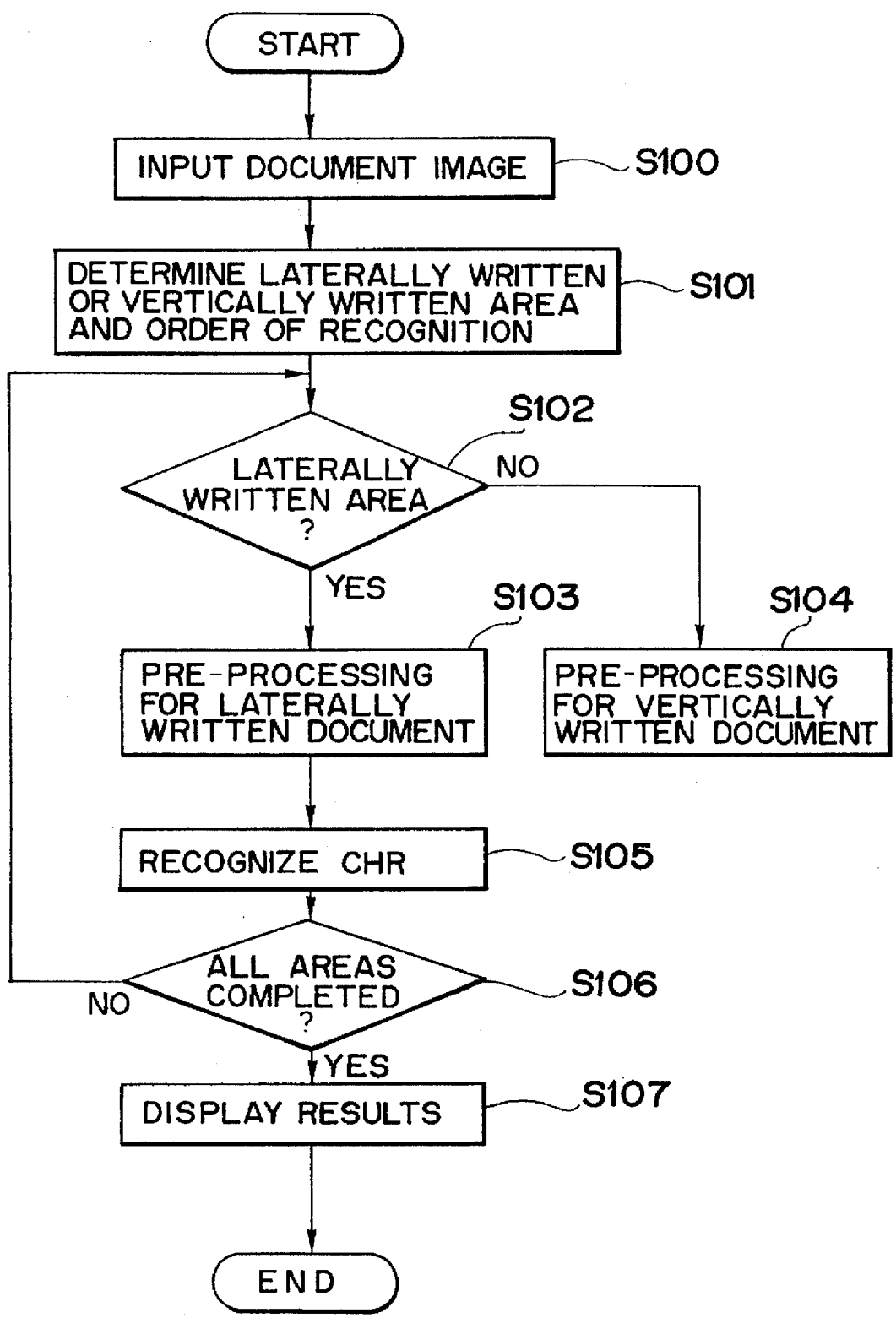
FIG. 19 is a third flow chart of the character recognition process.

FIG. 19 is a flow chart of the control sequence executed by the CPU 3 in the present embodiment, and a corresponding control program is stored in the ROM 4.

At first a step S100 enters a text image, set by the operator, through the input unit (scanner) 2 and stores said image in the memory 5. In the next step 101, the character determination unit 6 extracts horizontally written areas and vertically written areas from the text image stored in the memory 5, by determining projections (counts of black pixels) in the horizontal and vertical directions on the text image stored in the memory 5 and comparing the numbers of lines in which said count is at least equal to the reference value α or β.

Figures 20, 21:
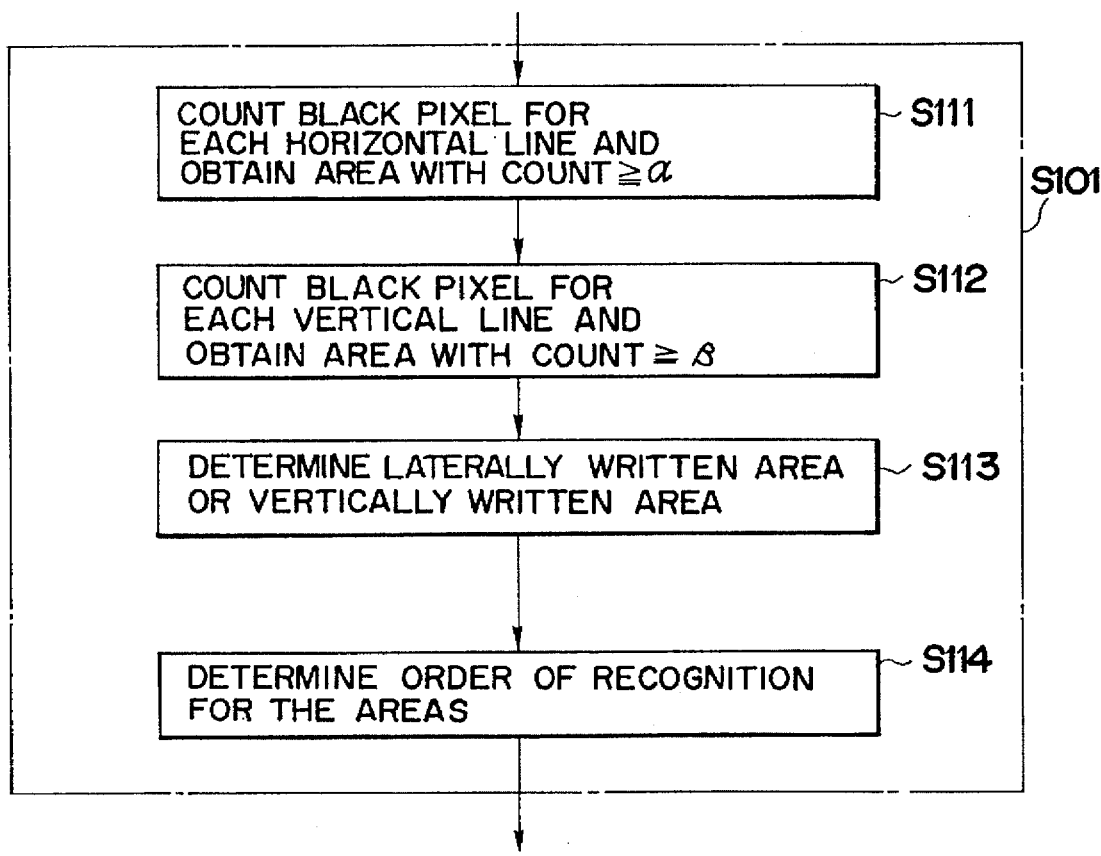
FIG. 20 is a ninth flow chart of the process for detecting the direction of a row of characters.
FIG. 21 is a view showing area separation by comparison of histograms with reference values.

FIG. 20 shows the details of said step S101 executed by the character row determination unit 6. At first a step S111 counts the black pixels in each line, and determines an area or areas in which the obtained count is at least equal to the reference value α. In the example shown in FIG. 18, such an area is indicated by 36.

The next step S112 similarly determines an area or areas in the vertical direction. In FIG. 18, such areas are indicated by 36, 37.

A step S113 then determines the horizontally written areas and vertically written areas in the text image.

The steps S111 and S112 classify the text image into areas of following four categories shown in FIG. 21:

Area A: where the count is at least equal to the reference value both in the horizontal and vertical directions.

In such area A, histograms are prepared again in said area, and the area is identified as horizontally or vertically written, respectively, according as the maximum value of the histogram minus the reference value is larger in the horizontal direction or in the vertical direction.

Area B: where the count is at least equal to the reference value only in the horizontal direction.

Such area is identified as horizontally written. Thus, the area 36 in FIG. 18 is identified as horizontally written. Since the areas 36 and 42 are mutually adjacent and have the same writing direction, the two areas are combined as an area.

Area C: where the count is at least equal to the reference value only in the vertical direction.

Such area is identified as vertically written. Thus, the area 37 in FIG. 18 is identified as vertically written.

Area D: where the count is less than the reference value in both the horizontal and vertical directions.

Histograms are again prepared in such area in the horizontal and vertical directions, and the area is identified as horizontally or vertically written respectively if the maximum value of the histogram minus the reference value is larger in the horizontal or vertical direction. A zero histogram indicates absence of characters in the area, as in the case of the area 41 in FIG. 18.

The above-mentioned reference value are corrected by the width and height of the text image.

After the identification of horizontally and vertically written areas, a step S114 determines the order of sequence of recognition of such areas, for example from top to bottom, according to the magnitude of coordinate value.

Again referring to the flow chart shown in FIG. 19, in the case of a horizontally written area, the sequence proceeds to a step S103 in which the pre-processing unit 7 effects pre-processing for horizontal writing, including character extraction by taking horizontal projection to extract a character row and then taking vertical projection on the extracted row or rows; normalizations on the position, inclination and density of character; and noise elimination.

On the other hand, if the step S102 identifies a vertically written area, the sequence proceeds to a step S104 in which the pre-processing unit 7 executes pre-processing for vertical writing, including character extraction by taking vertical projection to extract a character row and then taking horizontal projection on thus extracted row or rows; normalizations on the position, inclination and density of character; and noise elimination.

In the next step S105, the recognition unit 8 extracts features, such as contours, from the unknown character pattern pre-processed in the pre-processing unit 7. The dictionary 9 stores features of the standard patterns of all the characters to be recognized. The feature of said unknown character pattern is matched with the features of the standard patterns stored in the dictionary 9, and the most probable character is stored as the result of recognition in the memory 5, and all the characters in the input text image are similarly recognized and stored in the memory 5.

Then the sequence proceeds to a step S106, and returns to the step S102 if any unrecognized area still exists, or proceeds to a step S107 if all the areas have been recognized. The step S107 displays the results of recognition, stored in the memory 5, on the display unit 10. The process of outputting characters by the printer 13 will be omitted from the description.

As explained in the foregoing, the present embodiment provides a character recognition apparatus adaptable to any text that is horizontally or vertically written or contains both arrangements of writing.

Figure 22:
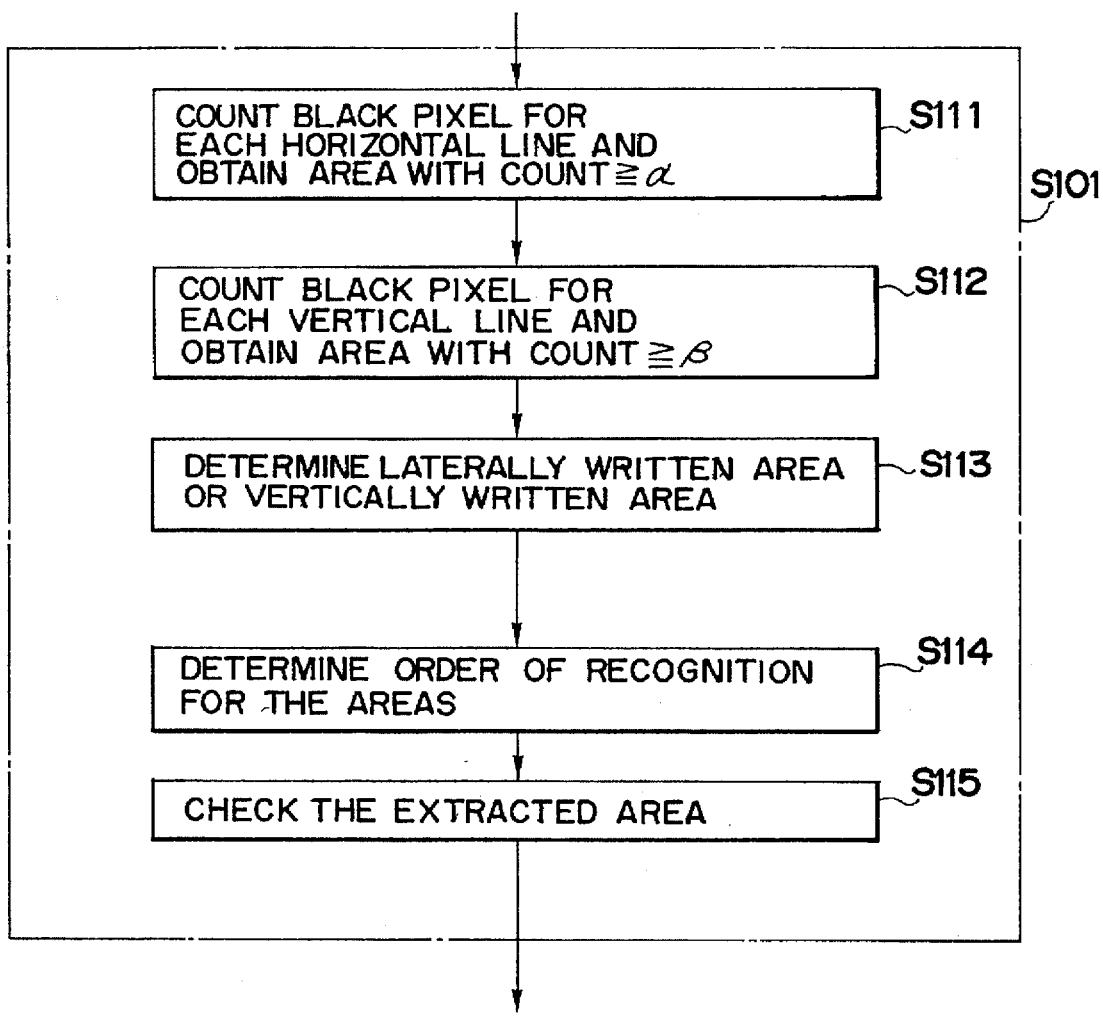
FIG. 22 is a tenth flow chart of the process for detecting the direction of a row of characters.

4.2 Embodiment requesting confirmation by operator on the identification of horizontal or vertical writing and on the order of recognition FIG. 22 shows the details of the step S101 in the present embodiment.

Steps S111–S114 determine the horizontally and vertically written areas in the same manner as in the embodiment 4.1. Then a step S115 determines the property (vertical or horizontal writing) of the extracted areas and the order of recognition thereof, through request to and confirmation by the operator.

What is claimed is:

1. An image processing method comprising the steps of:

inputting a document image comprising a mixture of a plurality of character trains having different directions;

counting black pixels of the document image in first and second mutually orthogonal directions;

comparing results obtained in said counting step with a threshold value to obtain comparison results;

identifying document image areas from the document image having the same comparison results obtained in said comparing step;

determining, in response to a comparison result in said comparing step, an extent of a laterally written area and an extent of a vertically written area in identified areas of the document image in each of the first and second mutually orthogonal directions; and extracting, from the document image, the laterally written area and the vertically written area based on determined extents of these areas in the first and second mutually orthogonal directions.

2. A method according to claim 1, wherein, in said comparing step, the threshold value is used for the first direction and a second, different, threshold value is used for the second direction.

3. A method according to claim 1, wherein the threshold value corresponds to a size of an area in the laterally written area or in the vertically written area.

4. A method according to claim 1, wherein said input step inputs the document image using a scanner.

5. A method according to claim 1, further comprising the steps of recognizing a character included in the document image; and displaying a recognition result on a display device.

6. A method according to claim 1, further comprising the steps of recognizing a character included in the document image; and printing a recognition result using a printer.

7. A method according to claim 1, further comprising the step of applying to each of the identified document image areas a selected one of a plurality of character extraction processes.

8. An image processing apparatus comprising:

input means for inputting a document image comprising a mixture of a plurality of character trains having different directions;

counter means for counting black pixels of the document image in first and second mutually orthogonal directions;

comparator means for comparing counting results obtained by said counter means with a threshold value;

identifying means for identifying document image areas from the document image having the same comparison results obtained by said comparator means;

determination means for determining, in response to a comparison result output by said comparator means, an extent of a laterally written area and an extent of a vertically written area in identified areas of the document image in each of the first and second mutually orthogonal directions; and extraction means for extracting, from the document image, the laterally written area and the vertically written area based on determined extents of these areas in the first and second mutually orthogonal directions.

9. An apparatus according to claim 8, wherein said threshold value is used for the first direction and a second, different, threshold value is used for the second direction.

10. An apparatus according to claim 8, wherein the threshold value corresponds to a size of an area in the laterally written area or in the vertically written area.

11. An apparatus according to claim 8, wherein said input means inputs the document image using a scanner.

12. An apparatus according to claim 8, further comprising recognizing means for recognizing a character included in the document image and displaying a recognition result on a display device.

13. An apparatus according to claim 8, further comprising recognizing means for recognizing a character included in the document image and printing a recognition result using a printer.

14. An apparatus according to claim 8, further comprising control means for applying to each of the identified document image areas a selected one of a plurality of character extraction processes.

15. Computer-executable process steps stored in a computer-readable medium, the computer-executable process steps comprising:

an input step to input a document image comprising a mixture of a plurality of character trains having different directions;

a counting step to count black pixels of the document image in first and second mutually orthogonal directions;

a comparing step to compare results obtained in said counting step with a threshold value to obtain a comparison result;

an identifying step to identify document image areas from the document image having the same comparison results obtained in said comparing step;

a determining step to determine, in response to a comparison result in said comparing step, an extent of a laterally written area and an extent of a vertically written area in identified areas of the document image in each of the first and second directions; and an extracting step to extract, from the document image, the laterally written area and the vertically written area based on determined extents of these areas in the first and second directions.

16. Computer-executable process steps according to claim 15, wherein in said comparing step, the threshold value is used for the first direction and a second, different, threshold value is used for the second direction.

17. Computer-executable process steps according to claim 15, wherein the threshold value corresponds to a size of an area in the laterally written area or in the vertically written area.

18. Computer-executable process steps according to claim 15, further comprising a recognizing step to recognize a character included in the document image; and a displaying step to display a recognition result on a display device.

19. Computer-executable process steps according to claim 15, further comprising a recognizing step to recognize a character included in the document image area; and a printing step to print a recognition result using a printer.

20. Computer-executable process steps according to claim 15, further comprising an applying step to apply to each of the extracted document image areas a selected one of a plurality of character extraction processes.

21. Computer-executable process steps according to claim 15, wherein the input step inputs the document image using a scanner.

* * * * *

UNITED STATES PATENT AND TRADEMARK OFFICE
CERTIFICATE OF CORRECTION

PATENT NO. : 5,696,841
DATED : December 9, 1997
INVENTOR(S) : Tadanori Nakatsuka It is certified that error appears in the above-indentified patent and that said Letters Patent is hereby corrected as shown below:

Column 5

Line 58, "the" should read --to--. (1st occur.)

Column 7

Line 20, "α for" should read --for α--.

Line 37, "S63" should read --S63 compares--.

Column 8

Line 23, delete "input". (1st occur.)

Signed and Sealed this

Seventh Day of July, 1998

Attest:

BRUCE LEHMAN

Attesting Officer

Commissioner of Patents and Trademarks